United States Patent
Kusajima

(10) Patent No.: US 12,315,299 B2
(45) Date of Patent: May 27, 2025

(54) MOTION RECOGNITION METHOD, NON-TRANSITORY COMPUTER-READABLE RECORDING MEDIUM AND INFORMATION PROCESSING APPARATUS

(71) Applicant: FUJITSU LIMITED, Kawasaki (JP)

(72) Inventor: Ikuo Kusajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 494 days.

(21) Appl. No.: 17/711,028

(22) Filed: Apr. 1, 2022

(65) Prior Publication Data

US 2022/0222975 A1 Jul. 14, 2022

Related U.S. Application Data

(63) Continuation of application No. PCT/JP2019/039193, filed on Oct. 3, 2019.

(51) Int. Cl.
*G06V 40/20* (2022.01)
*A63B 24/00* (2006.01)
(Continued)

(52) U.S. Cl.
CPC .......... *G06V 40/23* (2022.01); *A63B 24/0062* (2013.01); *G06T 7/215* (2017.01);
(Continued)

(58) Field of Classification Search
None
See application file for complete search history.

(56) References Cited

U.S. PATENT DOCUMENTS

2019/0066327 A1\* 2/2019 Fujimoto ................ G06T 7/60
2019/0220657 A1 7/2019 Yabuki et al.
(Continued)

FOREIGN PATENT DOCUMENTS

EP 3726468 A1 \* 10/2020 ............. G01P 13/00
JP 2019-54900 A 4/2019
(Continued)

OTHER PUBLICATIONS

International Search Report and Written Opinion mailed on Dec. 10, 2019, received for PCT Application PCT/JP2019/039193, Filed on Oct. 3, 2019, 8 pages including English Translation.
(Continued)

*Primary Examiner* — Andrew H Lam
(74) *Attorney, Agent, or Firm* — XSENSUS LLP

(57) ABSTRACT

A motion recognition method includes acquiring skeleton information, in chronological order, that includes positions of respective joints of a subject performing a series of motions that includes a plurality of basic motions, using a processor. The motion recognition method includes first determining which one of a first motion recognition method using a first feature amount that is determined as a result of the basic motion, and a second motion recognition method using a second feature amount that changes in a process of the basic motion is to be adopted, depending on a type of the basic motions, using the processor. The motion recognition method includes second determining a type of the basic motion by using the skeleton information by either determined one of the first motion recognition method and the second motion recognition method, using the processor, and outputting the determined type of the basic motion, using the processor.

14 Claims, 17 Drawing Sheets

(51) Int. Cl.
  G06T 7/215 (2017.01)
  G06T 7/246 (2017.01)
  G06T 7/73 (2017.01)
(52) U.S. Cl.
  CPC ............... *G06T 7/246* (2017.01); *G06T 7/73* (2017.01); *A63B 2220/05* (2013.01); *A63B 2220/805* (2013.01); *G06T 2207/20081* (2013.01); *G06T 2207/30196* (2013.01); *G06T 2207/30221* (2013.01)

(56) References Cited

U.S. PATENT DOCUMENTS

| | | | |
|---|---|---|---|
| 2020/0188736 A1 | 6/2020 | Naito et al. | |
| 2020/0302617 A1 | 9/2020 | Yabuki | |

FOREIGN PATENT DOCUMENTS

| | | |
|---|---|---|
| WO | 2018/070414 A1 | 4/2018 |
| WO | 2019/049216 A1 | 3/2019 |
| WO | 2019/116495 A1 | 6/2019 |

OTHER PUBLICATIONS

Japanese Office Action mailed on Aug. 8, 2023 in the corresponding Japanese patent application No. 2021-550899, 10pp.
Extended European Search Report issued Sep. 2, 2022, in European Application No. 19947501.3.
Mao Ye et al: "A Survey on Human Motion Analysis from Depth Data : Dagstuhl 2012 Seminar on Time-of-Flight Imaging and GCPR 2013 Workshop on Imaging New Modalities" In: "arXiv. org", Jan. 1, 2013 (Jan. 1, 2013), Cornell University Library,, 201 Olin Library Cornell University Ithaca, NY 14853, XP055657330, vol. 8200, pp. 149-187.
Jixu Chen et al: "Switching Gaussian Process Dynamic Models for simultaneous composite motion tracking and recognition", 2009 IEEE Conference on Computer Vision and Pattern Recognition : CVPR 2009 ; Miami [Beach], Florida, USA, Jun. 20-25, 2009, IEEE, Piscataway, NJ, Jun. 20, 2009 (Jun. 20, 2009), pp. 2655-2662, XP031607107, ISBN: 978-1-4244-3992-8.
Tobias Jaeggli et al: "Learning Generative Models for Multi-Activity Body Pose Estimation", International Journal of Computer Vision, Kluwer Academic Publishers, BO, vol. 83, No. 2, Jul. 31, 2008 (Jul. 31, 2008), pp. 121-134, XP019690421 , ISSN: 1573-1405.
Chinese Office Action issued Jan. 14, 2025, in corresponding Chinese Patent Application No. 201980100910.8, 19pp.

* cited by examiner

| FRAME | IMAGE INFORMATION | SKELETON INFORMATION |
|---|---|---|
| 1 | IMAGE DATA A1 | HEAD (X3, Y3, Z3), ··· |
| ··· | ··· | ··· |

FIG.11

| RESULT FEATURE AMOUNT | BASIC MOTION NAME |
|---|---|
| CUMULATIVE TWIST ANGLE≥X<br>MAXIMUM SPLIT ANGLE≥B<br>DIFFERENCE IN HEIGHT BETWEEN<br>LEFT FOOT AND SHOULDER>A | BASIC MOTION AA |
| ... | ... |

FIG.12

| COMBINATION OF BASIC MOTIONS | ELEMENT NAME |
|---|---|
| BASIC MOTION A, BASIC MOTION B, BASIC MOTION C | ELEMENT XX |
| ... | ... |

MOTION RECOGNITION METHOD, NON-TRANSITORY COMPUTER-READABLE RECORDING MEDIUM AND INFORMATION PROCESSING APPARATUS

CROSS-REFERENCE TO RELATED APPLICATION

This application is a continuation application of International Application PCT/JP2019/039193, filed on Oct. 3, 2019, and designating the U.S., the entire contents of which are incorporated herein by reference.

FIELD

The present invention relates to a motion recognition method, a motion recognition program, and an information processing apparatus.

BACKGROUND

Automatic recognition of a motion of a person by using skeleton information of the person, such as an athlete and a patient, has been practiced in a wide range of areas, such as gymnastics and medical fields. In recent years, apparatuses that recognize three dimensional skeleton coordinates of a person based on a depth map output by a three dimensions (3D) laser sensor that senses a distance to the person (hereinafter, denoted also as distance sensor or depth sensor), and that automatically recognize a motion of the person by using a recognition result have been used.

For example, if it is explained with gymnastics as an example, a series of motions is segmented by using a recognition result of skeleton information of a performer acquired in chronological order, and divided into basic motion units. Furthermore, a feature amount using orientations of joints and the like is calculated for each segmented section, and by comparing a feature amount to identify basic motion with predetermined rules, a performed element is automatically recognized from a series of motions.

Patent Literature 1: International Publication Pamphlet No. WO 2018/070414

SUMMARY

According to an aspect of an embodiment, a motion recognition method includes: acquiring skeleton information, in chronological order, that includes positions of respective joints of a subject performing a series of motions that includes a plurality of basic motions, using a processor; first determining which one of a first motion recognition method using a first feature amount that is determined as a result of the basic motion, and a second motion recognition method using a second feature amount that changes in a process of the basic motion is to be adopted, depending on a type of the basic motions, using the processor; second determining a type of the basic motion by using the skeleton information by either determined one of the first motion recognition method and the second motion recognition method, using the processor; and outputting the determined type of the basic motion, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram explaining a result feature-amount rule.

FIG. 12 is a diagram explaining element recognition rule.

DESCRIPTION OF EMBODIMENTS

A basic motion is a motion that is obtained by segmenting a series of motions based on a change of a supporting state by using skeleton information, and it can be a variety of motions, and has a high degree of freedom. As a method of recognizing such motions of a high degree of freedom, it is considered to define a feature amount that is used to recognize each basic motion, and to use a rule base in which rules of respective feature amounts are defined as many as the number of basic motions, and to use a training model using a machine learning.

In the case of a rule base, as the degree of freedom of a basic motion increases, the number of feature amount to recognize respective basic motions increases, and rules to be defined becomes complicated as a result. On the other hand, in the case of using a training model, it is not necessary to define feature amounts. However, although a recognition result of a basic motion is output from the training model, it does not necessarily match with an accurate judgement criterion in a sport, or the like. For example, even when an output of "somersault" is obtained, it can be a case in which this output result does not definitely satisfy requirements of somersault in a rule book for artistic gymnastics depending on data used at the time of training.

Hereinafter, embodiments of a motion recognition method, a motion recognition program, and an information processing apparatus according to the present invention will be explained in detail based on the drawings. The embodiments are not intended to limit the present invention. Moreover, the respective embodiments can be appropriately combined within a range not causing contradiction.

First Embodiment

Entire Configuration

Figure 1:
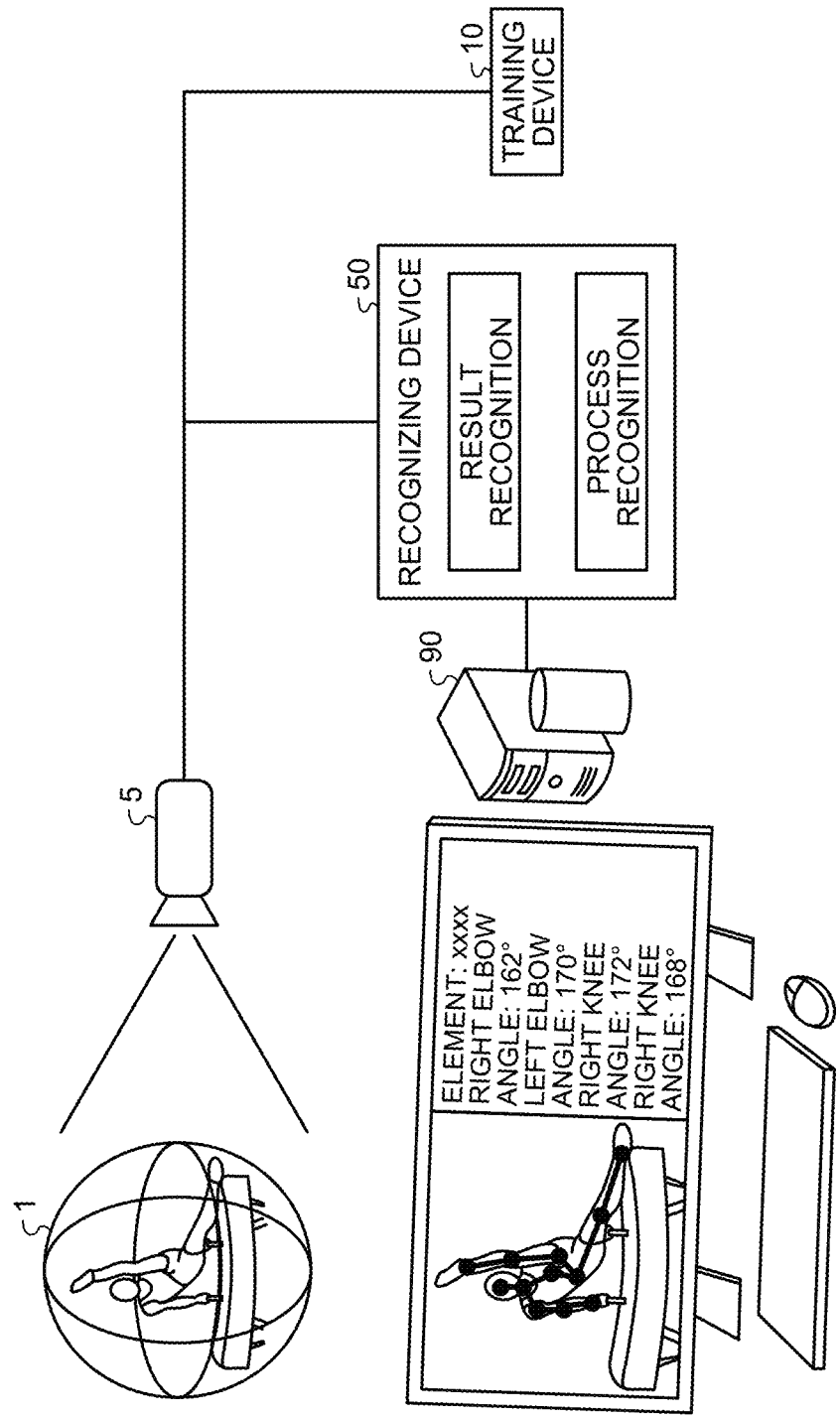
FIG. 1 is a diagram illustrating an entire configuration example of an automatic scoring system according to a first embodiment.

FIG. 1 is a diagram illustrating an entire configuration example of an automatic scoring system according to a first embodiment. As illustrated in FIG. 1, this system includes a 3D laser sensor 5, a training device 10, a recognizing device 50, and a scoring device 90, and is a system that captures three-dimensional data of a performer 1, which is a subject to be imaged, and performs accurate scoring of an element by recognizing skeletons and the like. In the present embodiment, an example in which skeleton information of a performer in gymnastics is recognized will be explained, as an example.

The 3D laser sensor 5 is one example of a sensor that images a depth map of the performer 1, the training device 10 is one example of an apparatus that performs training of a model used by the recognizing device 50. The recognizing device 50 is one example of an apparatus that automatically recognizes an element in performance by using skeleton information that indicates three-dimensional skeleton positions of the performer 1 based on a depth map, and the scoring device 90 is one example of a device that automatically scores performance of the performer 1 by using a recognition result by the recognizing device 50.

Generally, the scoring method at present in gymnastics is performed by visual observations by multiple judges, but with increased sophistication of elements, there are more and more cases in which scoring by visual observation of judges is difficult. In recent years, an automatic scoring system or a scoring supporting system for events scored by judges using a 3D sensor has been developed. For example, in these systems, a depth map, which is three-dimensional data, of an athlete is acquired by a 3D laser sensor, and a skeleton, such as a location of respective joints, and an angle of respective joints, of the athlete is recognized from the depth map. The scoring support system supports judges to score more accurately by displaying a result of skeleton recognition by a 3D model to enable the judges to review a state of detailed position of a performer. Moreover, in the automatic scoring system, a performed element is recognized from a result of skeleton recognition, and scoring is performed by comparing with a scoring rule.

In the automatic recognition of a performed element, basic motions that are segmented motions of a series of motions of the performer 1 based on changes of supporting state are identified by using skeleton information that is acquired as a result of the skeleton recognition, and an element is identified based on a combination of basic motions among the respective segments.

The recognition of basic motions is performed by a rule-based method, for the case when it describes about a relationship among body parts that changes with time for a motion having a high degree of freedom, and the rule can be complicated. Furthermore, although recognition can be performed without describing complicated rules if machine learning is applied, there is a case in which requirements under scoring rules of competition are not guaranteed to be satisfied, and a recognition for overall performance can be reduced.

Accordingly, in the first embodiment, segmented basic motions are classified into one that is necessary to be observed its process, and one that is not necessary, by the recognizing device 50, recognition using a process feature amount that changes in the process of a basic motion, and recognition using a result feature amount that is determined as a result of the basic motion in a section are performed, and the basic motion is recognized by their combination.

Figure 2:
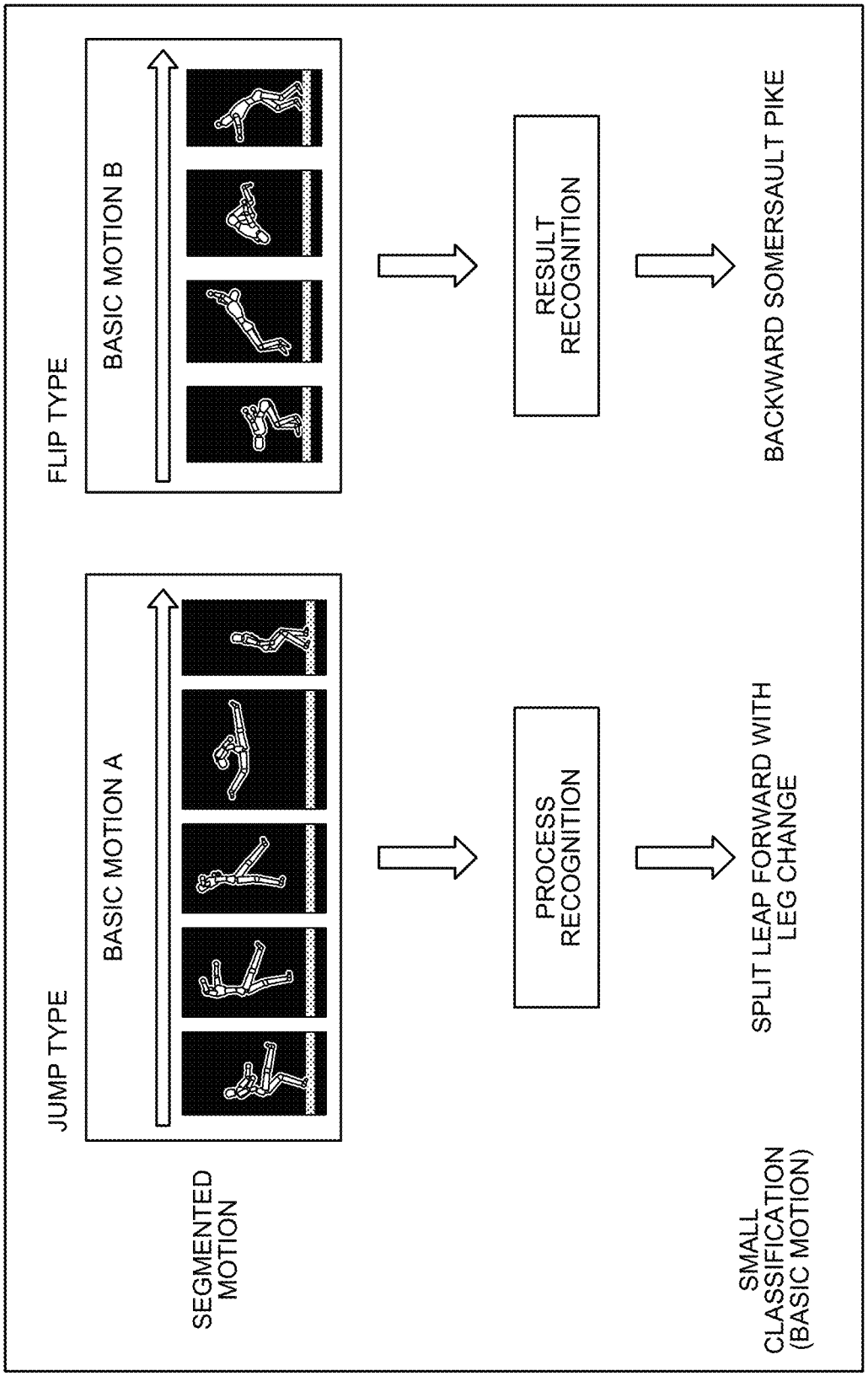
FIG. 2 is a diagram explaining a recognizing device according to the first embodiment.

FIG. 2 is a diagram explaining the recognizing device 50 according to the first embodiment. As illustrated in FIG. 2, a basic motion is roughly distinguished between a basic motion A that has a large necessity for composite and consecutive evaluation of motions of respective joints of an entire body (high degree of freedom), and a basic motion B that has a low necessity for composite and consecutive evaluation of motion of respective joints of an entire body (low degree of freedom). The basic motion A is, for example, jump type motions. The basic motion B is, for example, flip type motions.

The jump type basic motion A often includes multiple frames of making a jump among frames within a section, and it is difficult to determine what kind of motion (action) is being made from just one frame. Therefore, it is preferable that details of a jump type basic motion be determined by using feature amounts changing in the process (process feature amount) of the respective frames within the section. On the other hand, the flip type basic motion B can be determined as a flip type motion if a single frame of making a flip is included in frames within the section. Therefore, by using a feature amount that is determined as a result of a series of motions of entire frames in the section (result feature amount), details of a flip type basic motion can be determined.

From the above, the recognizing device 50 performs accurate motion recognition by switching between a recognition model that has been trained by deep learning with process feature amounts and a rule base in which a result feature amount and a name of basic motion are associated with each other, depending on a type of motion.

Figure 3:
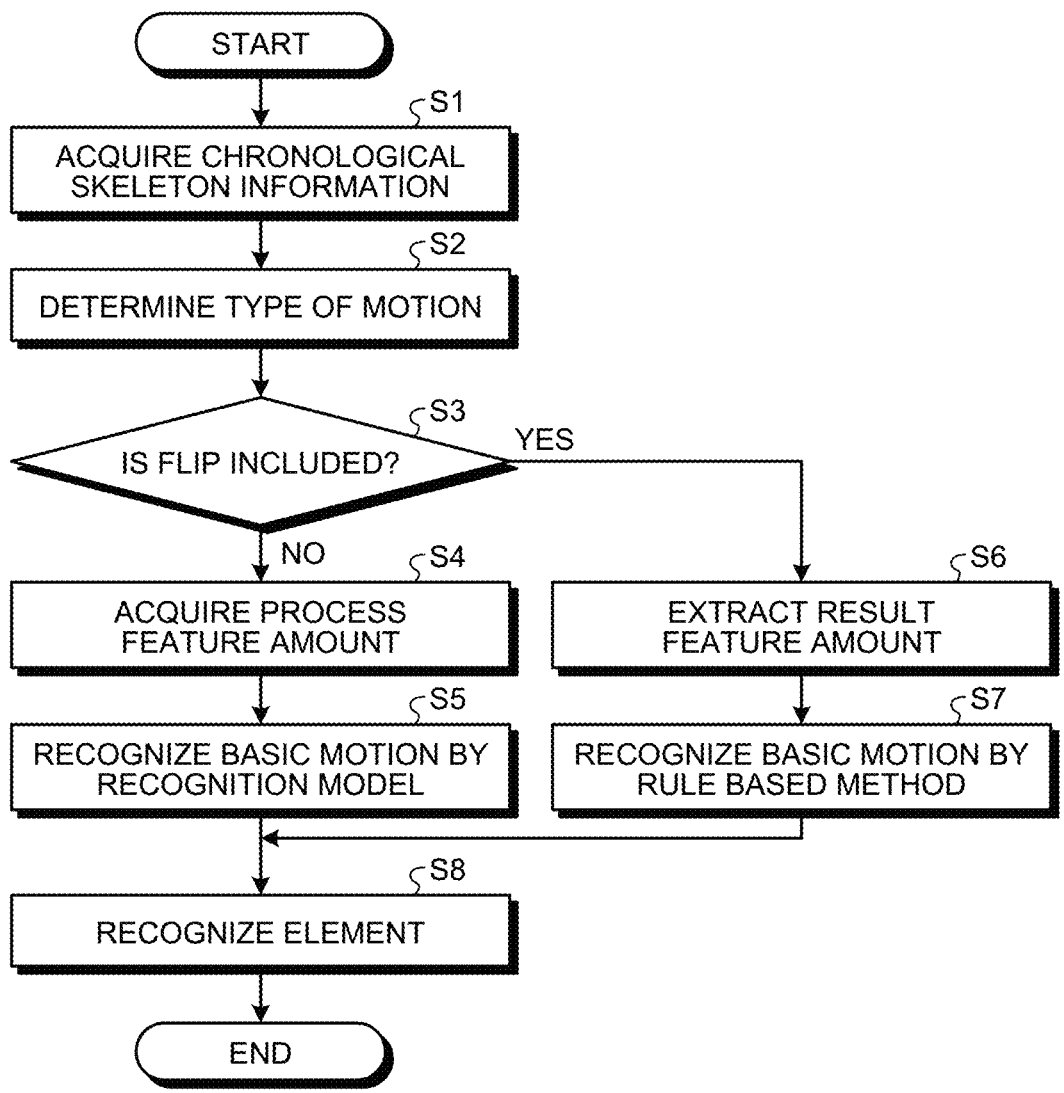
FIG. 3 is a flowchart illustrating a flow of recognition processing according to the first embodiment.

FIG. 3 is a flowchart illustrating a flow of recognition processing according to the first embodiment. As illustrated in FIG. 3, the recognizing device 50 acquires chronological skeleton information (S1), and determines a type of motion of an event being performed (S2). In the case of an event not including a flip, such as the pommel horse (S3: NO), the recognizing device 50 acquires process feature amounts within a section (S4), and performs basic motion recognition by a recognition model (S5). On the other hand, in the case of an event including a flip, such as the balance beam and the floor (S3: YES), the recognizing device 50 extracts a result feature amount within a section (S6), and performs basic motion recognition by a rule base (S7). Thereafter, the recognizing device 50 recognizes an element performed by the performer 1 by using the recognized basic motions (S8).

For example, as illustrated in FIG. 2, as for a jump type basic motion, the recognizing device 50 identifies a basic motion name as "split leap forward with leg change" by the process recognition using a recognition model. Moreover, the recognizing device 50 identifies a basic motion name as "backward somersault pike" by the result recognition using a rule base.

As described, the recognizing device 50 achieves accurate element recognition by using a recognition method suitable for a type of motion for various kinds of motions.

Functional Configuration

Next, a functional configuration of respective devices included in the system illustrated in FIG. 1 will be explained. Herein, each of the training device 10, the recognizing device 50, and the scoring device 90 will be explained.

Configuration of Training Device 10

Figure 4:
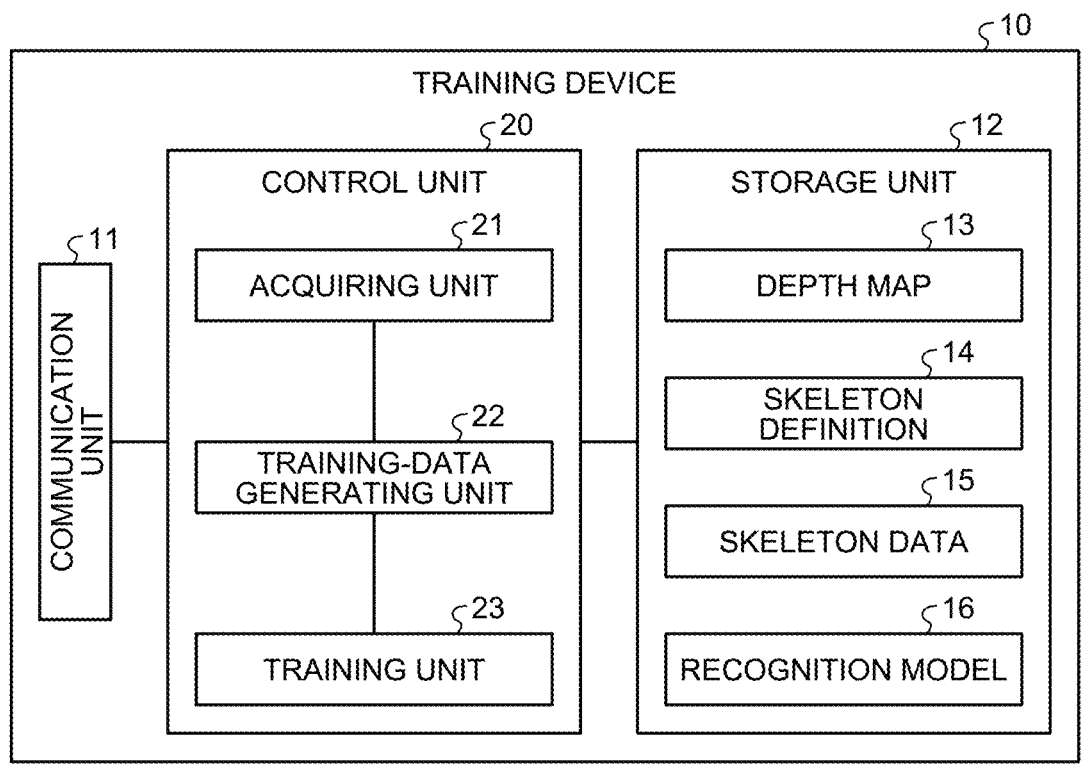
FIG. 4 is a functional block diagram illustrating a functional configuration of a training device according to the first embodiment.

FIG. 4 is a functional block diagram illustrating a functional configuration of the training device 10 according to the first embodiment. As illustrated in FIG. 4, the training device 10 includes a communication unit 11, a storage unit 12, and a control unit 20.

The communication unit 11 is a processing unit that controls communication with other devices, and is, for example, a communication interface or the like. For example, the communication unit 11 receives a depth map of the performer 1 captured by the 3D laser sensor 5, receives various kinds of data and instructions from an administrator terminal and the like, and transmits a trained recognition model to the recognizing device 50.

The storage unit 12 is a storage device that stores data and a program executed by the control unit 20, and the like, and is, for example, a memory, a processor, or the like. This storage unit 12 stores a depth map 13, a skeleton definition 14, skeleton data 15, and a recognition model 16.

Figure 5:
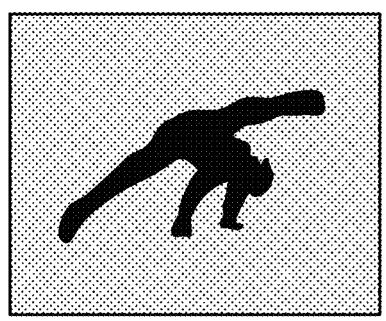
FIG. 5 is a diagram explaining a depth map.

The depth map 13 is a depth map of the performer 1 that is captured by the 3D laser sensor 5. FIG. 5 is a diagram explaining the depth map 13. As illustrated in FIG. 5, the depth map 13 is data including a distance from the 3D laser sensor 5 to a performer 1, and it is displayed in a deeper color as the distance from the 3D laser sensor 5 decreases. The depth map 13 is captured at all times during performance of the performer 1.

The skeleton definition 14 is definition information to identify respective joints on a skeleton model. The definition information stored herein may be measured for each performer by 3D sensing by the 3D laser sensor, or may be defined by using a skeleton model of a general body shape.

Figures 6, 7:
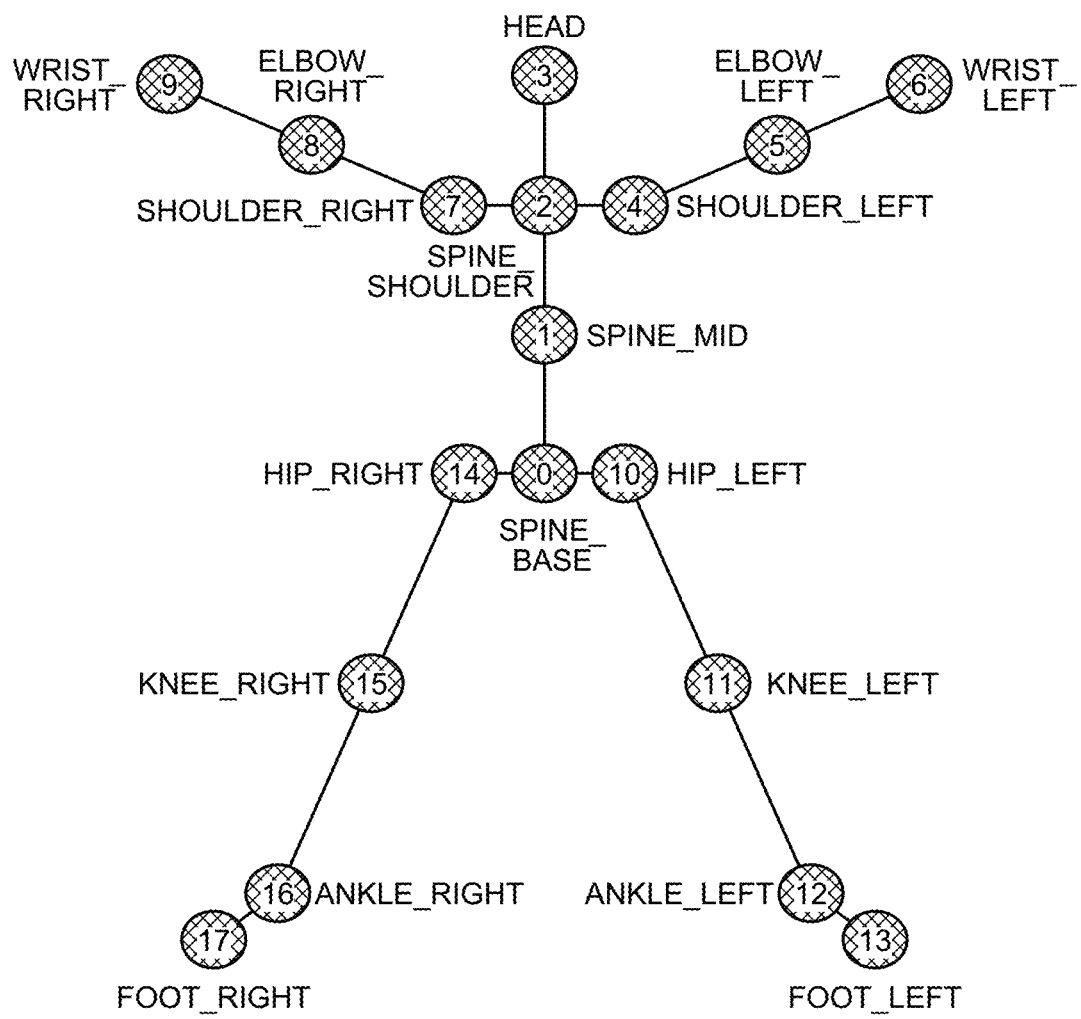
FIG. 6 is a diagram explaining skeleton definition.
FIG. 7 is a diagram explaining skeleton data.

FIG. 6 is a diagram explaining the skeleton definition 14. As illustrated in FIG. 6, the skeleton definition 14 stores 18 pieces (No. 0 to No. 17) of definition information in which respective joints identified by a publicly known skeleton model are numbered. For example, as illustrated in FIG. 4, a right shoulder joint (SHOULDER_RIGHT) is numbered with 7, a left elbow joint (ELBOW_LEFT) is numbered with 5, a left knee joint (KNEE_LEFT) is numbered with 11, and a right hip joint (HIP_RIGHT) is numbered with 14. In the embodiment, it can be described as X7 for an X coordinate, Y7 for a Y coordinate, and Z7 for a Z coordinate of No. 7 right shoulder joint. For example, a Z axis can be defined as a distance direction toward an object from the 3D laser sensor 5, a Y axis as a height direction perpendicular to the Z axis, and an X axis as a horizontal direction.

The skeleton data 15 is data including information about a skeleton that is generated by using respective depth maps. Specifically, the skeleton data 15 includes positions of the respective joints defined by the skeleton definition 14 acquired by using the depth map. FIG. 7 is a diagram explaining the skeleton data 15. As illustrated in FIG. 7, the skeleton data 15 is information in which "FRAME, IMAGE INFORMATION, SKELETON INFORMATION" are associated with one another.

"FRAME" is an identifier to identify each frame that is captured by the 3D laser sensor 5, and "IMAGE INFORMATION" is data of a depth map in which positions of joints and the like are known. "SKELETON INFORMATION" is three-dimensional position information of skeleton, and consists of joint positions (three dimensional coordinates) corresponding to the respective 18 joints illustrated in FIG. 6. The example in FIG. 7 indicates that positions of 18 joints including a coordinate "X3, Y3, Z3" of HEAD are known in "IMAGE DATA A1", which is a depth map. The joint positions can be extracted by using a training model to extract respective joint positions from a depth map, which is a training model trained in advance, and the like.

The recognition model 16 is a training model to recognize a basic motion performed by the performer 1 based on chronological skeleton information, and is a training model that uses a neural network trained by a training unit 23 described later, and the like. For example, the recognition model 16 estimates a basic motion performed by the performer 1 from among plural basic motions, by training chronological changes of skeleton information of a performer as feature amounts (process feature amounts).

The control unit 20 is a processing unit that controls the entire training device 10, and is, for example, a processor or the like. The control unit 20 includes an acquiring unit 21, a training-data generating unit 22, and the training unit 23, and performs training of the recognition model 16. The acquiring unit 21, the training-data generating unit 22, and the training unit 23 are one example of an electronic circuit of a processor and the like, or one example of a process included in a processor and the like.

The acquiring unit 21 is a processing unit that acquires various kinds of data. For example, the acquiring unit 21 acquires a depth map from the 3D laser sensor 5, and stores it in the storage unit 12. Moreover, the acquiring unit 21 acquires skeleton data from an administrator terminal and the like, and stores it in the storage unit 12.

The training-data generating unit 22 is a processing unit that generates training data used for training of the recognition model 16. Specifically, the training-data generating unit 22 generates training data in which a name of basic motion to be correct answer information is associated with chronological skeleton information, and stores it in the storage unit 12, and outputs it to the training unit 23.

Figure 8:
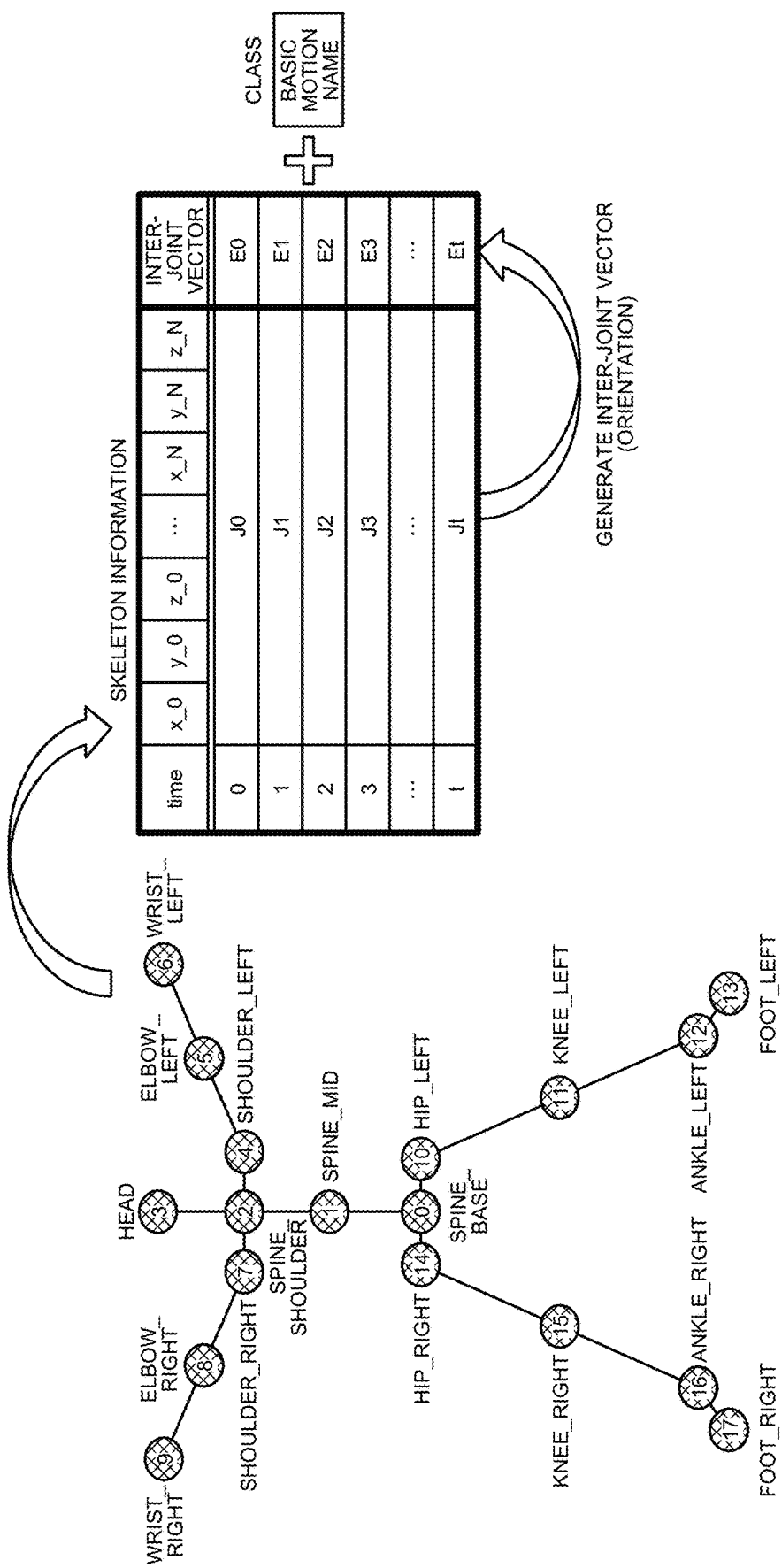
FIG. 8 is a diagram explaining generation of training data.

FIG. 8 is a diagram explaining generation of training data. As illustrated in FIG. 8, the training-data generating unit 22 refers to respective skeleton information of the skeleton data 15 in a frame corresponding to a known basic motion, and calculates an inter-joint vector indicating an orientation between joints. For example, the training-data generating unit 22 inputs joint information into Equation (1) for each of skeleton information (J0) of a frame of time=0 to skeleton information (Jt) of a frame of time=t, to calculate an inter-joint vector of each of the frames. Note that x, y, z in Equation (1) indicate coordinates, i indicates the number of joints, $e_{i,x}$ indicates a magnitude of an i-th inter-joint vector in an x-axis direction, $e_{i,y}$ indicates a magnitude of the i-th inter-vector in a y-axis direction, and $e_{i,z}$ indicates a magnitude of the i-th inter-joint vector in a z-axis direction.

$$\hat{e}_{i,x} = \frac{e_{i,x}}{|e_i|}, \hat{e}_{i,y} = \frac{e_{i,y}}{|e_i|}, \hat{e}_{i,z} = \frac{e_{i,z}}{|e_i|}, \left(|e_i| = \sqrt{e_{i,x}^2 + e_{i,y}^2 + e_{i,z}^2}\right) \quad (1)$$

Thereafter, the training-data generating unit 22 generate training data in which a series of inter-joint vector including inter-joint vectors of respective frames relating to the basic motion and a known basic motion name (discipline) are associated with each other.

The number of frames relating to a basic motion can be set arbitrarily to 10 frames or 30 frames, and is preferable to be the number of frames that enable to express characteristics of a jump type basic motion not including a flip. Moreover, although the skeleton information is denoted as J0 or the like in FIG. 8 for simplicity of explanation, in an actual situation, coordinates of x, y, z values (total 18×3=54 pieces) are set to each of the 18 joints. Furthermore, similarly for the inter-joint vectors, although it is denoted as E0 or the like, vectors of respective axes (x, y, z axes) from the joint number 0 to 1, vectors of respective axes from the joint number 1 to 2, and the like are included.

The training unit 23 is a processing unit that performs training of the recognition model 16 by using the training data generated by the training-data generating unit 22. Specifically, the training unit 23 optimizes parameters of the recognition model 16 by supervised training using the training data, stores the trained recognition model 16 in the storage unit 12, and transmits it to the recognizing device 50. Timing of ending the training can be arbitrarily set to a point of time when training using a predetermined number or more pieces of training data is completed, a point of time when a reconstruction error has become smaller than a threshold, or the like.

Figure 9:
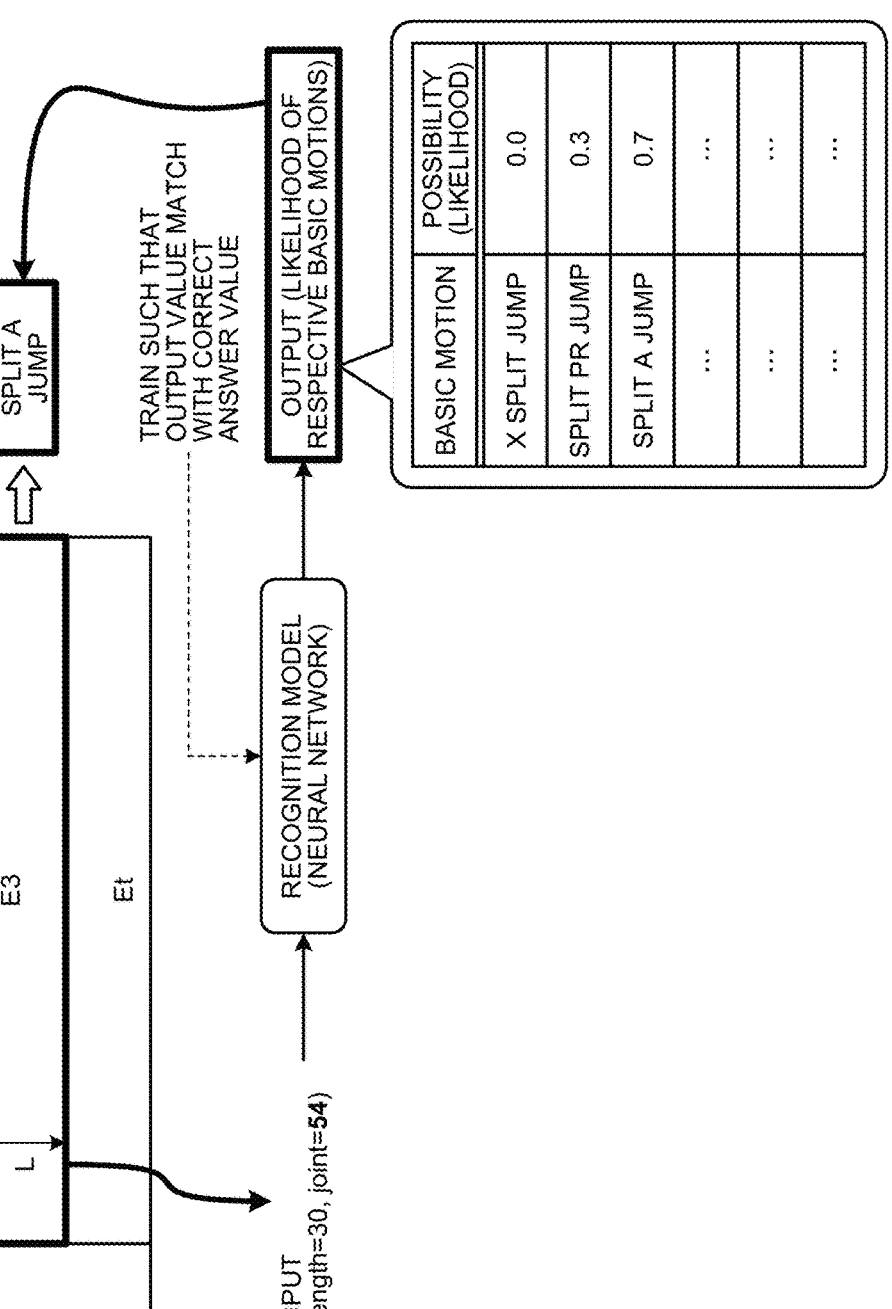
FIG. 9 is a diagram explaining training of a recognition model.

FIG. 9 is a diagram explaining training of the recognition model 16. As illustrated in FIG. 9, the training unit 23 identifies L pieces of chronological training data from skeleton information (J3) of a frame of time=3, acquires respective inter-joint vectors as an explanation variable, and input the L pieces of training data to the recognition model 16. The training unit 23 trains the recognition model 16 such that an output result and an objective variable coincide with each other, by the error backpropagation method based on an error between the output result and the objective variable, "basic motion name".

For example, the training unit 23 acquires 30 pieces of inter-joint vectors of a frame 3 to frame N as an explanation variable, a basic motion name "SPLIT A JUMP", to be associated with these frames. The training unit 23 inputs the acquired 30 pieces of the respective inter-joint vectors to the recognition model 16 as one piece of input data, and acquires a possibility (likelihood) of matching with respective 89 basic motions that has been specified in advance as an output result of the recognition model 16.

Thereafter, the training unit 23 trains the recognition model 16 such that the possibility of "SPLIT A JUMP" being the objective variable is the highest among possibilities of matching with the respective basic motions. Thus, the training unit 23 trains the recognition model 16 with changes of inter-joint vectors that characterize a basic motion as a feature amount.

Because the training unit 23 inputs, for example, 30 frames as one piece of input data as chronological skeleton data to the recognition model 16, it is possible to shape training data by padding or the like. For example, when a predetermined number of pieces of data each are acquired while shifting one by one from original data including t pieces of skeleton information from a frame 0 of time=0 to a frame t of time=t, to match the number of the respective training data, by copying data in data of the first frame, and by copying data of the last frame, the number of training data is increased.

Configuration of Recognizing Device 50

Figure 10:
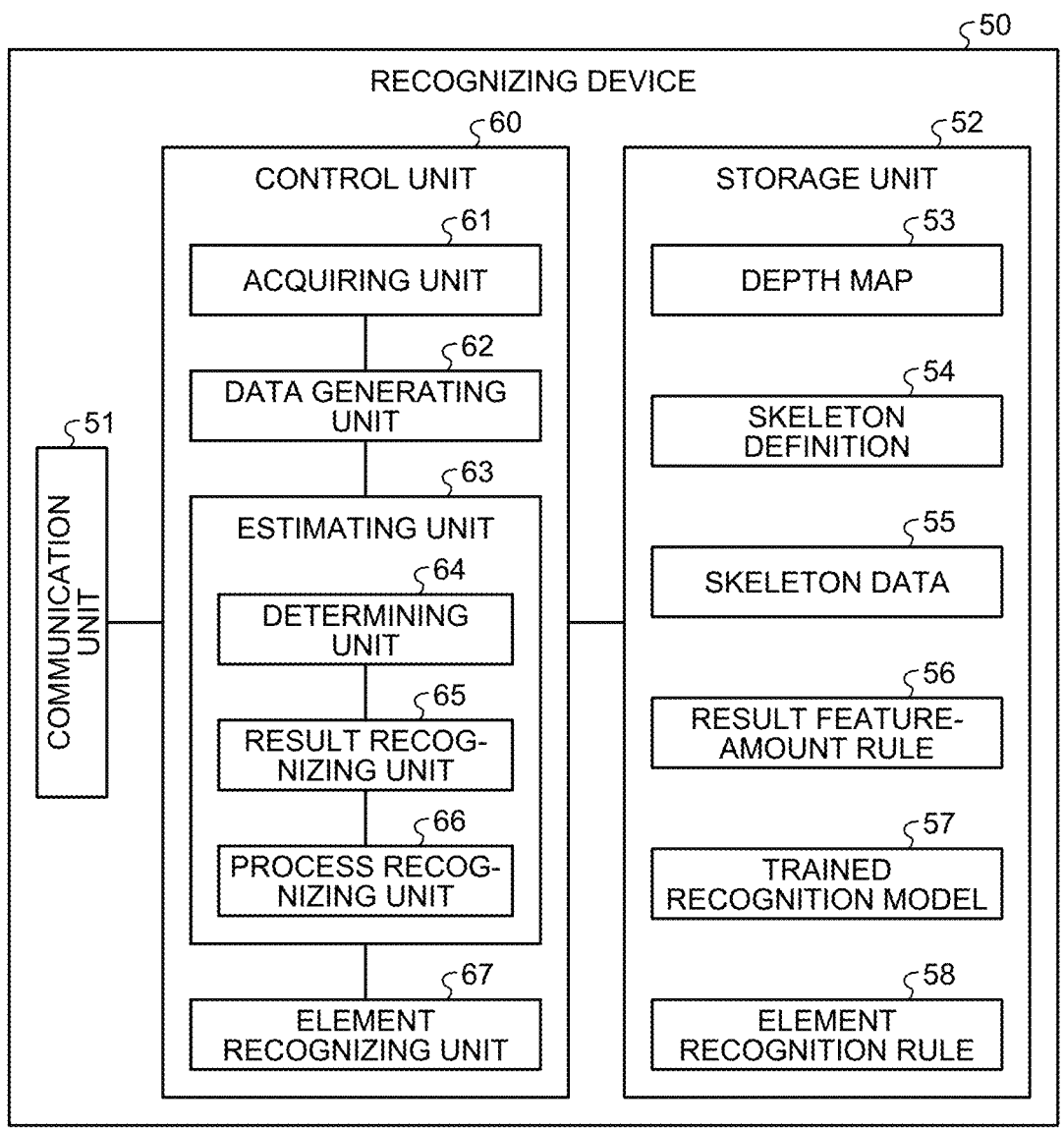
FIG. 10 is a functional block diagram illustrating a functional configuration of the recognition apparatus according to the first embodiment.

FIG. 10 is a functional block diagram illustrating a functional configuration of the recognizing device 50 according to the first embodiment. As illustrated in FIG. 10, the recognizing device 50 includes a communication unit 51, a storage unit 52, and a control unit 60.

The communication unit 51 is a processing unit that controls communication with other devices, and is, for example, a communication interface or the like. For example, the communication unit 51 receives a depth image of the performer 1 captured by the 3D laser sensor 5, receives a trained recognition model from the training device 10, and transmits various kinds of recognition results to the scoring device.

The storage unit 52 is a storage device that stores data and a program executed by the control unit 60, and the like, and is, for example, a memory, a processor, or the like. This storage unit 52 stores a depth map 53, a skeleton definition 54, skeleton data 55, a result feature-amount rule 56, a trained recognition model 57, and an element recognition rule 58.

The depth map 53 is a depth map of the performer 1 that is captured by the 3D laser sensor 5, and is, for example, a depth map that is acquired by imaging performance of a performer to be scored. The skeleton definition 54 is definition information to identify respective joints in a skeleton model. Because the skeleton definition 54 is same as that in FIG. 6, detailed explanation will be omitted.

The skeleton data 55 is data including information about skeleton generated for each frame by a data generating unit 62 described later. Specifically, the skeleton data 55 is information in which "FRAME, IMAGE INFORMATION, SKELETON INFORMATION" are associated with one another similarly to FIG. 5.

The result feature-amount rule 56 is information that is referred to when a flip type basic motion having a high degree of freedom is identified. Specifically, the result feature-amount rule 56 is information in which a result feature amount and a basic motion name are associated with each other. As a result feature amount, for example, a combination of a cumulative twist angle, a maximum split angle, a difference in height between a left foot and a shoulder can be used.

FIG. 11 is a diagram explaining the result feature-amount rule 56. As illustrated in FIG. 11, the result feature-amount rule 56 is information in which "RESULT FEATURE AMOUNT, BASIC MOTION NAME" are associated with each other. "RESULT FEATURE AMOUNT" is a feature amount determined as a result of a basic motion within a segmented section, and "BASIC MOTION NAME" is a discipline (name) of a basic motion for which the result feature amount is acquired. The example of FIG. 11 indicates that when "a cumulative twist angle is equal to or larger than X degree, a maximum split degree is equal to or larger than B degree, and a difference in height between a left foot and a shoulder is equal to or larger than A cm", it is determined as basic motion AA.

The trained recognition model 57 is a recognition model trained by the training device 10. This trained recognition model 57 is a training model to recognize a basic motion performed by the performer 1 based on chronological skeleton information.

The element recognition rule 58 is information that is referred to when an element performed by the performer 1 is recognized. Specifically, the element recognition rule 58 is information in which a name of an element and information set in advance to identify an element are associated with each other. FIG. 12 is a diagram explaining the element recognition rule 58. As illustrated in FIG. 12, the element recognition rule 58 stores "COMBINATION OF BASIC MOTIONS, ELEMENT NAME" associating with each other. The example in FIG. 12 indicates that when "BASIC MOTION A, BASIC MOTION B, BASIC MOTION C" are sequentially performed, it is recognized as "ELEMENT XX".

The control unit 60 is a processing unit that controls the entire recognizing device 50, and is, for example, a processor or the like. The control unit 60 includes an acquiring unit 61, the data generating unit 62, an estimating unit 63, and an element recognizing unit 67, and performs recognition of a basic motion having a high degree of freedom, or recognition of an element in which basic motions are combined. The acquiring unit 61, the data generating unit 62, the estimating unit 63, and the element recognizing unit 67 are one example of an electronic circuit of a processor, or one example of a process included in the processor.

The acquiring unit 61 is a processing unit that acquires various kinds of data and various kinds of instructions. For example, the acquiring unit 61 acquires a depth map based on a measurement result (three-dimensional dot group data) by the 3D laser sensor 5, and stores it in the storage unit 52. Moreover, the acquiring unit 61 acquires the trained recognition model 57 from the training device 10, and stores it in the storage unit 12.

The data generating unit 62 is a processing unit that generates skeleton information including positions of 18 joints from the respective depth maps. For example, the data generating unit 62 generates skeleton information in which positions of 18 joints are identified by using the trained model to recognize the skeleton information from a depth map. The data generating unit 62 stores the skeleton data 55 in which number of frame corresponding to a depth map, the depth map, and skeleton information are associated with one another in the storage unit 52. Moreover, the skeleton information in the skeleton data 15 in the training device 10 can also be generated by a similar method.

Figure 13:
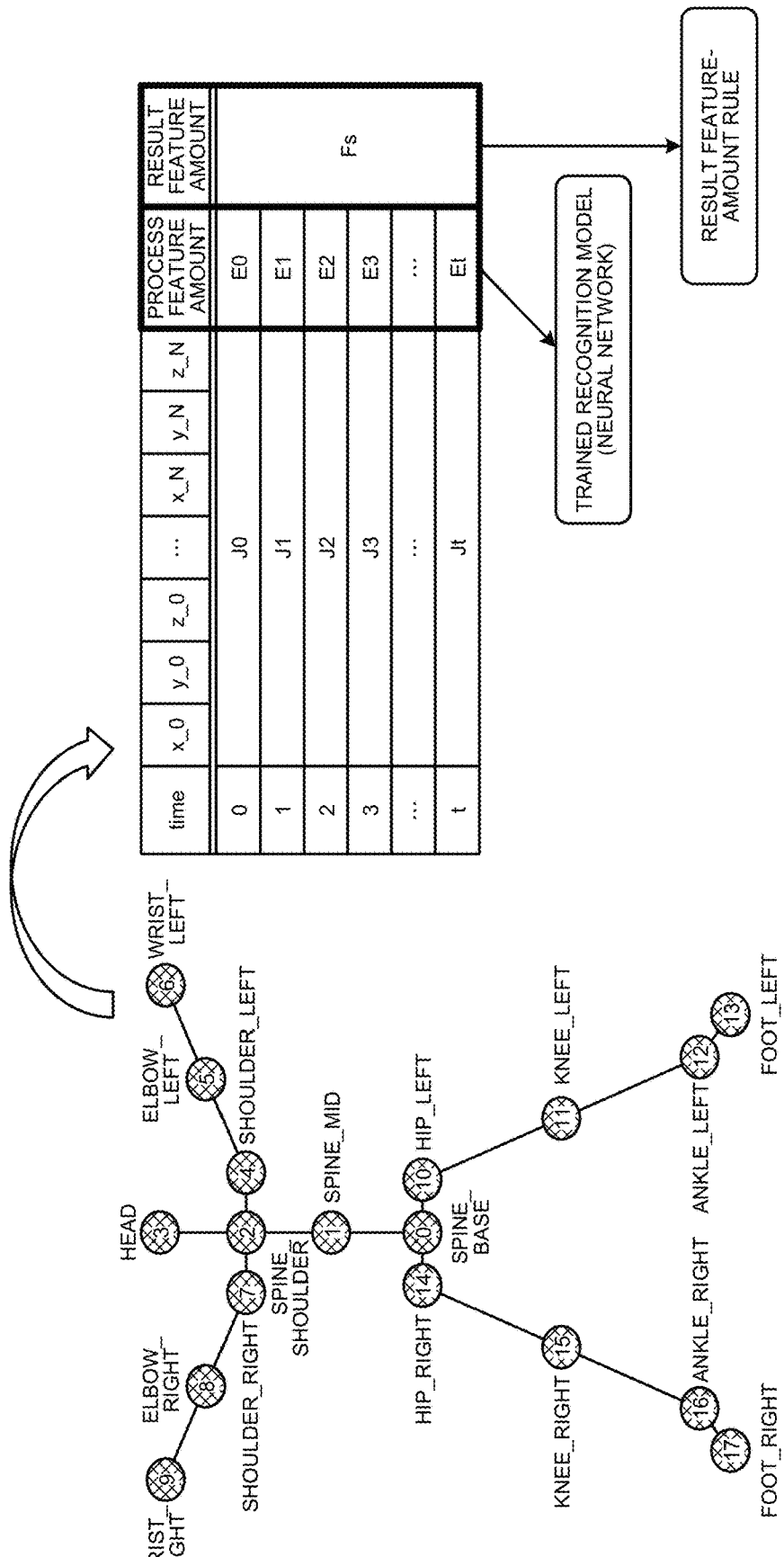
FIG. 13 is a diagram explaining recognition of a basic motion by using a feature amount.

The estimating unit 63 includes a determining unit 64, a result recognizing unit 65, and a process recognizing unit 66, and is a processing unit that performs accurate recognition of a basic motion by switching between a recognition model that has been trained by deep learning with process feature amounts and a rule base in which a result feature amount and a name of basic motion are associated with each other, depending on a type of motion. FIG. 13 is a diagram explaining recognition of a basic motion by using a feature amount. Herein, an example in which frames between a frame at time=0 and a frame at time=t will be explained.

As illustrated in FIG. 13, the estimating unit 63 performs recognition of a basic motion using the trained recognition model 57 with respective process feature amounts from the frame at time=0 to the frame at time=t as input data when recognition of a basic motion is performed by the process recognition. On the other hand, when recognition of a basic motion by the result recognition is performed, the estimating unit 63 generates a result feature amount from respective skeleton information from the frame at time=0 to the frame at time=t, and performs recognition of a basic motion according to the result feature-amount rule 56.

The determining unit 64 is a processing unit that determines which of the process recognition or the result recognition is to be performed based on a type of motion. In the case of a discipline subject to recognition being the balance beam or the floor as an example, the determining unit 64 determines to perform the result recognition for a motion including a rotation in a flip direction, and determines to perform the process recognition for motions other than that.

Moreover, the determining unit 64 performs scoring of segmentation points. Specifically, when a body position to be a break of performance (action) is detected, the determining unit 64 determines the body position as a segmentation point, and outputs a segmented section between a segmentation point and a segmentation point to the result recognizing unit 65 or the process recognizing unit 66 as an object to be recognized. For example, the determining unit 64 refers to skeleton information, and when a body position in which both feet touch a predetermined position (the ground, a floor, a beam surface of the balance beam, or the like), a predesignated body position, or a supporting position on a gymnastic apparatus (for example, a position of supporting wrists on a horseback of the pommel horse, or on pommels) is detected, the determining unit 64 determines that the relevant body position as a segmentation point.

The result recognizing unit 65 is a processing unit that recognizes a basic motion performed in a segmented section by using a result feature amount that is determined as a result of a series of motions of entire frames within the segmented section. Specifically, the result recognizing unit 65 calculates a result feature amount by using skeleton information of frames corresponding to a segmented section between a segmentation point and a segmentation point notified by the determining unit 64. The result recognizing unit 65 refers to the result feature-amount rule 56, and acquires a basic motion name that is associated with the calculated result feature amount. Thereafter the result recognizing unit 65 outputs the recognized basic motion name, the segmented section, and skeleton information between segments, and the like to the element recognizing unit 67.

For example, the result recognizing unit 65 calculates a cumulative twist angle, a maximum split angle, and a difference in height between a left foot and a shoulder, as a result feature amount. Specifically, the result recognizing unit 65 calculates a twist angle ($\Delta T_t$) of unit time by using a general method, and calculates the cumulative twist angle by $\Sigma_t \Delta T_t$. Furthermore, the result recognizing unit 65 calculates the maximum split angle by using Equation (2). In Equation (2), $j_{11}$ indicates skeleton information of joint number 11, $j_{10}$ indicates skeleton information of joint number 10, $j_{14}$ indicates skeleton information of joint number 14, and $j_{15}$ indicates skeleton information of skeleton number 15. Moreover, the result recognizing unit 65 calculates the difference in height between a left foot and a shoulder by max ($z_{13}-z_4$). $z_{13}$ is a coordinate of the z-axis of joint number 13, and $z_4$ is a coordinate of the z-axis of joint number 4. Note that the joint number is number in skeleton definition illustrated in FIG. 6.

$$\max_t \arccos \frac{(j_{11} - j_{10}) \cdot (j_{15} - j_{14})}{|j_{11} - j_{10}||j_{15} - j_{14}|} \qquad (2)$$

When the maximum split angle is smaller than 135 degree, it is recognized as insufficient split. Moreover, when the difference in height between the left foot and the shoulder is smaller than 0, it is recognized as insufficient height of the left leg. In these cases, it is determined as insufficient as a feature amount to identify a basic motion.

Furthermore, other than these feature amounts, for example, the number of times of twist, a layout, pike, or tuck flip position may be used. The number of times of twist can be calculated by "([cumulative twist angle+30)/180]/2 ([x] is the largest positive integer smaller than x).

Returning back to FIG. 10, the process recognizing unit 66 is a processing unit that recognizes a basic motion performed in a segmented section by using a process result feature amount that changes in the process of respective frames within the segmented section. Specifically, the process recognizing unit 66 calculates a process feature amount for skeleton information of the respective frames corresponding to the segmented section between a segmentation point and a segmentation point notified by the determining unit 64. The process recognizing unit 66 inputs the respective process feature amounts in the segmented section to the trained recognition model 57, and recognizes a basic motion based on an output result of the trained recognition model 57. The process recognizing unit 66 then outputs a recognized basic motion name, a segmented section, skeleton information between segments, and the like to the element recognizing unit 67.

Figure 14:
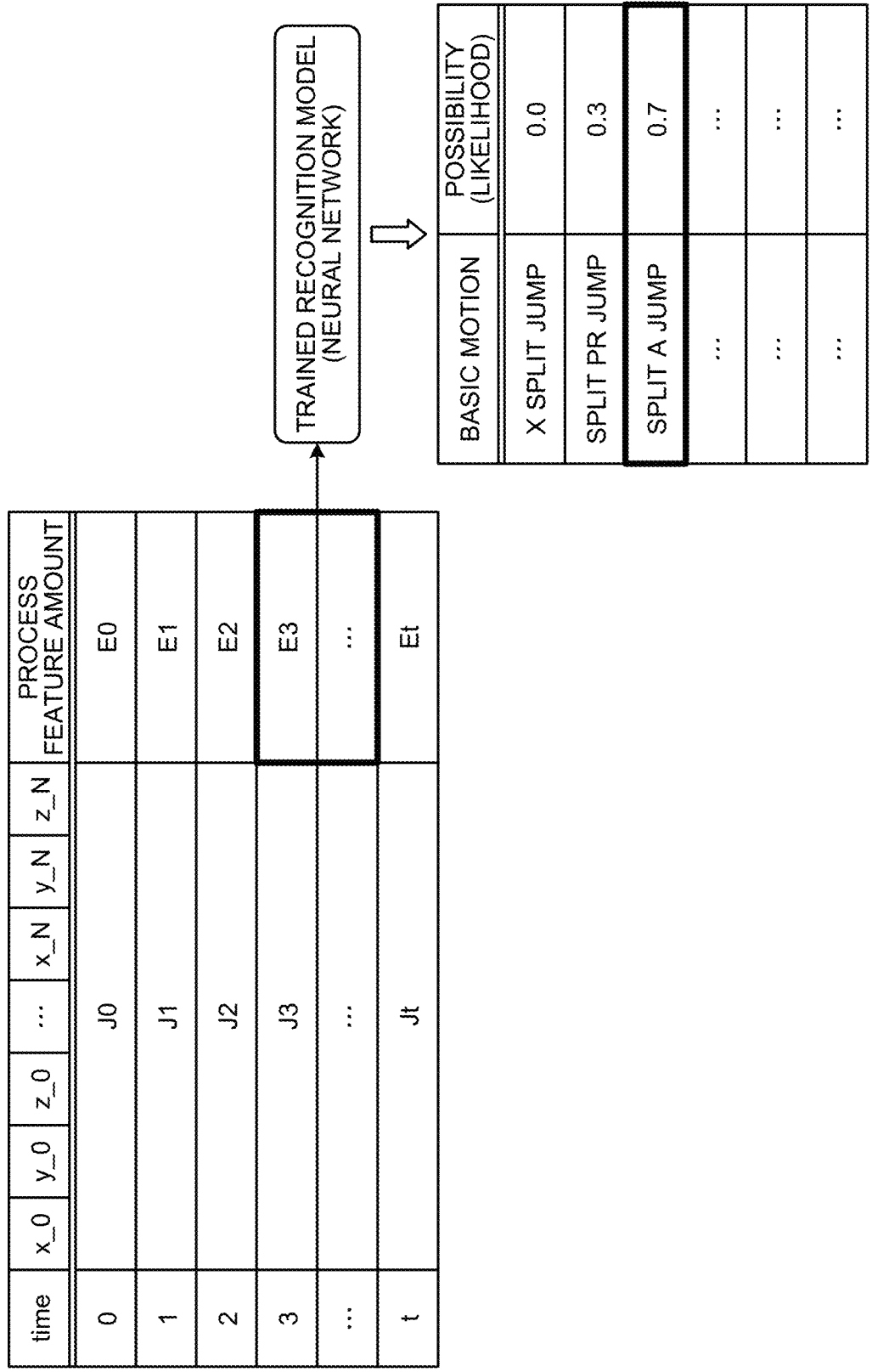
FIG. 14 is a diagram explaining recognition of a basic motion by using a process feature amount.

FIG. 14 is a diagram explaining recognition of a basic motion based on a process feature amount. As illustrated in FIG. 14, the process recognizing unit 66 acquires respective process feature amounts including a process feature amount (E3) generated from skeleton information (J3) of a frame at time=3 corresponding to a segmented section subject to determination, from the skeleton information generated by the data generating unit 62, and inputs it to the trained recognition model 57.

Thereafter, the process recognizing unit 66 acquires a possibility of 89 basic motion names as an output result of the trained recognition model 57. The process recognizing unit 66 acquires "SPLIT A JUMP" having the highest possibility out of the possibilities of the 89 basic names. the process recognizing unit 66 recognizes "SPLIT A JUMP" as the basic motion.

The element recognizing unit 67 is a processing unit that recognizes an element performed by the performer 1 by using a recognition result of a basic motion by the estimating unit 63. Specifically, the element recognizing unit 67 acquires a recognition result of a basic motion in respective segmented sections from the result recognizing unit 65 when the discipline is the balance beam or the floor. The element recognizing unit 67 then compares the recognition result with the element recognition rule 58, to identify an element name, and output it to the scoring device 90. Moreover, the element recognizing unit 67 acquires a recognition result of a basic motion of respective segmented sections from the process recognizing unit 66 when the discipline is other than the balance beam or the floor. The element recognizing unit 67 then compares the recognition result with the element recognition rule 58, to identify an element name. For example, the element recognizing unit 67 recognizes as "ELEMENT XX" when basic motions in the respective segmented sections are recognized as "BASIC MOTION A, BASIC MOTION B, BASIC MOTION C".

Configuration of Scoring Device 90

Figure 15:
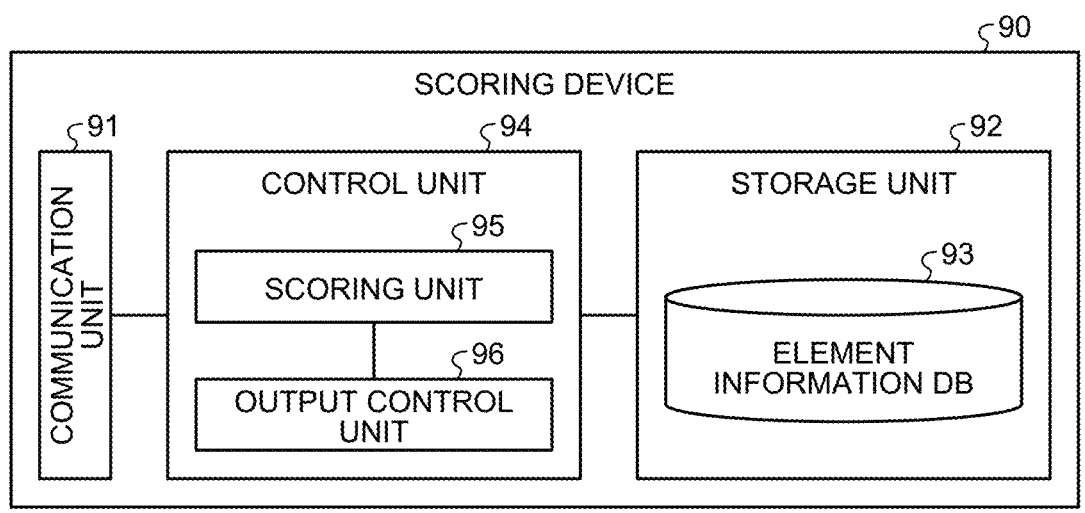
FIG. 15 is a functional block diagram illustrating a functional configuration of a scoring device according to the first embodiment.

FIG. 15 is a functional block diagram illustrating a functional configuration of the scoring device 90 according to the first embodiment. As illustrated in FIG. 8, the scoring device 90 includes a communication unit 91, a storage unit 92, and a control unit 94. The communication unit 91 receives a recognition result of an element from the recognizing device 50, skeleton information of a performer (three-dimensional skeleton position information), and the like.

The storage unit 92 is one example of a storage device that stores data, a program executed by the control unit 94, and the like, and is, for example, a memory, a hard disk, or the like. This storage unit 92 stores element information 93. The element information 93 is information in which an element name, a difficulty, a score, positions of respective joints, an angle of joint, a scoring rule, and the like are associated with one another. Moreover, the element information 93 includes various other kinds of information used for scoring.

The control unit 94 is a processing unit that controls the entire scoring device 90, and is, for example, a processor or the like. This control unit 94 includes a scoring unit 95 and an output control unit 96, and performs scoring of a performer according to information input from the recognizing device 50, and the like.

The scoring unit 95 is a processing unit that performs scoring of an element of a performer or scoring of performance of a performer. Specifically, the scoring unit 95 refers to the element information 93, and identifies performance in which multiple elements are combined, based on a recognition result of an element that is sequentially transmitted from the recognizing device 50. The scoring unit 95 compares skeleton information of the performer, an identified performance, an input recognition result of an element, and the like with the element information 93, and performs scoring of the element performed by the performer 1 or the performance. For example, the scoring unit 95 calculates a D (Difficulty) score or a E (Execution) score. The scoring unit 95 outputs a scoring result to the output control unit 96. The scoring unit 95 can also perform scoring by using a scoring rule widely used.

The output control unit 96 is a processing unit that displays a scoring result by the scoring unit 95 and the like on a display or the like. For example, the output control unit 96 acquires various kinds of information, such as a depth map captured by the respective 3D laser sensors, three-dimensional skeleton information, respective image data during performance of the performer 1, and a scoring result, from the recognizing device 50, to display on a predetermined screen.

Training Processing

Figure 16:
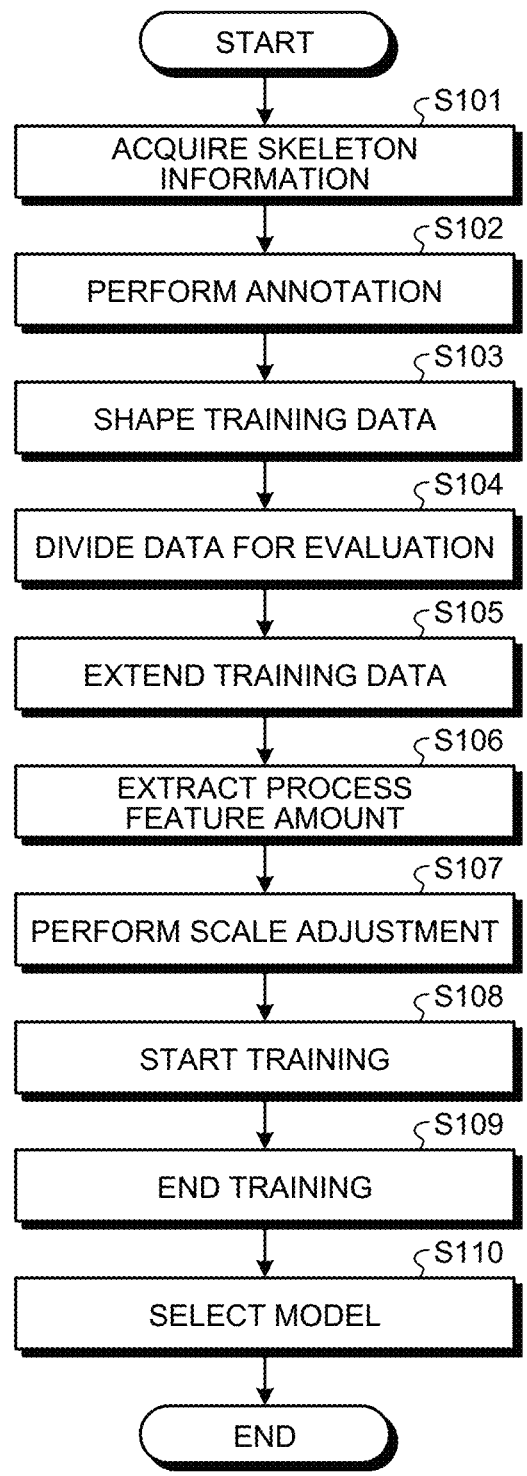
FIG. 16 is a flowchart illustrating a flow of training processing.

FIG. 16 is a flowchart illustrating a flow of training processing. As illustrated in FIG. 16, the training-data generating unit 22 of the training device 10 acquires respective skeleton information included in the respective skeleton data 15 (S101), and performs annotation to generate correct answer information of a basic motion (S102).

Subsequently, the training-data generating unit 22 divides into frames of respective segmented sections in which a basic motion is performed, or performs shaping of training data in which padding is performed (S103). The training-data generating unit 22 divides training data into data for training to be used for training, and data for evaluation to be used for evaluation (S104).

Thereafter, the training-data generating unit 22 performs data extension of training data including inversion per apparatus coordinate axis, translation along an apparatus, addition of random noise, and the like (S105). For example, the training-data generating unit 22 changes orientation of data that are oriented in different right and left directions to the same orientation, to increase the training data, and the like.

The training-data generating unit 22 extracts a process feature amount by using skeleton information of frames corresponding to respective segmented sections (S106). Subsequently, the training-data generating unit 22 performs scale adjustment including normalization, standardization, and the like (S107).

The training unit 23 determines an algorithm, a network, a hyper parameter, and the like of the recognition model 16, and performs training of the recognition model 16 by using the training data (S108). At this time, the training unit 23 evaluates training accuracy (evaluation error) of the recognition model 16 being trained, by using the data for evaluation per epoch.

Thereafter, the training unit 23 ends the training when a predetermined condition, such as the number of times of training exceeding a threshold, and the evaluation error becoming a certain value or smaller (S109). The training unit 23 selects the recognition model 16 when the evaluation error is minimized (S110).

Automatic Scoring Processing

Figure 17:
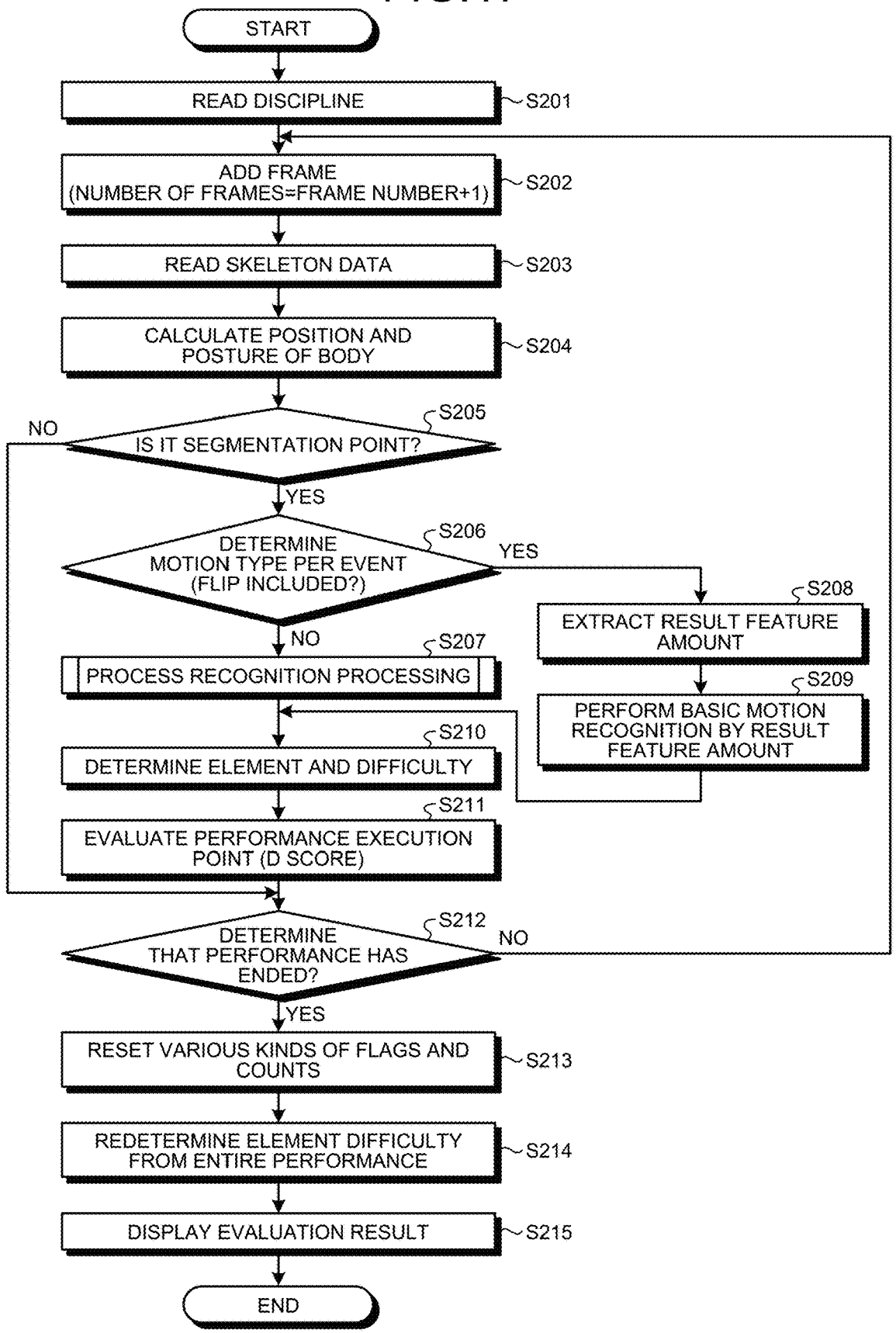
FIG. 17 is a flowchart illustrating a flow of automatic scoring.

FIG. 17 is a flowchart illustrating a flow of automatic scoring processing. As illustrated in FIG. 17, the recognizing device 50 reads a discipline to be scored designated in advance by an administrator or the like (S201), updates the number of frames to be processed to a value obtained by adding 1 to the frame number (S202).

Subsequently, the estimating unit 63 of the recognizing device 50 reads skeleton data of respective frames generated by the data generating unit 62 (S203), calculates a position and a posture of the body including an angle and orientation of the body, and a height of left and right feet, and the like of the performer 1, and detects segmentation points (S204).

When the segmentation points are detected (S205: YES), the estimating unit 63 of the recognizing device 50 determines a type of motion based on event information (S206). For example in the balance beam, in the case of motion not including a flip (S206: NO), the estimating unit 63 of the recognizing device 50 performs recognition of a basic motion by the process recognition processing for frames in a segmented section (S207). On the other hand, in the case of motion including a flip (S206: YES), the estimating unit 63 extracts a result feature amount by using skeleton information of a fame in a segmented section (S208), and performs recognition of a basic motion by the result recognition processing (S209). For example, the estimating unit 63 uses a rotation amount in a flipping direction for determination of a type of motion when the event is the balance beam at S206. The estimating unit 63 determines rotation by determining characteristics of motion from the other feature amounts in the other events.

Thereafter, element recognition by the element recognizing unit 67 and difficulty determination of an element or the like by the scoring device 90 are performed (S210). The scoring device 90 calculates a D score and the like by evaluating performance execution point (S211). Thereafter, while the performance continues (S212: NO), processing at S202 and later are repeated.

On the other hand, when the performance has ended (S212: YES), the scoring device 90 resets various kinds of flags and counts used for scoring (S213), and performs redetermination of the difficulty of an element or totalization from the entire performance (S214).

Thereafter, the scoring device 90 stores the evaluation result and the like in the storage unit 92, or displays it on a display device, such as a display (S215). When a segmentation point is not detected at S205 (S205: NO), processing at S212 and later are performed.

Process Recognition Processing

Figure 18:
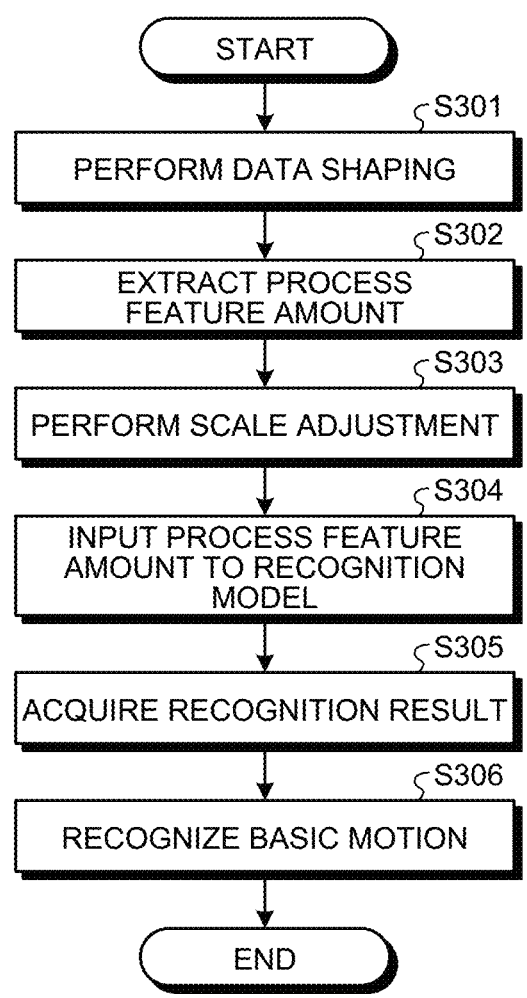
FIG. 18 is a flowchart illustrating a flow of process recognition processing.

FIG. 18 is a flowchart illustrating a flow of the process recognition processing. This processing is performed at S207 in FIG. 17.

As illustrated in FIG. 18, the data generating unit 62 of the recognizing device 50 divides (classifies) acquired all frames into segmented sections similarly to the case of training, or performs data shaping of a subject of recognition in which padding or the like is performed (S301).

Subsequently, the data generating unit 62 extracts (calculates) a process feature amount by using skeleton information of respective frames in a segmented section (S302), and performs scale adjustment including normalization, standardization, and the like with respect to the frame subject to recognition (S303).

The estimating unit 63 of the recognizing device 50 inputs the process feature amount generated from chronological skeleton information to the trained recognition model 57 (S304), and acquires a recognition result from the trained recognition model 57 (S305). Thereafter, the estimating unit 63 performs recognition of a basic motion based on the recognition result (S306).

Effect

As described above, the recognizing device 50 performs classification of chronological information of segmented skeleton information of the entire body by using a simple feature amount that is, for example, whether a flip is included or not. The recognizing device 50 performs the process recognition when a flip is not included, and the result recognition when a flip is included, based on the classification result, and can output a recognition result of a final basic motion from those recognition results. That is, the recognizing device 50 roughly classifies types of segmented basic motions, and can perform recognition by a recognition method suitable for each large classification.

Therefore, the recognizing device 50 performs the rule-based basic motion recognition for a motion having a low degree of freedom, and performs basic motion recognition by the training model for a motion having a high degree of freedom. As a result, by using a method suitable for a type of motion, the recognizing device 50 can avoid generating as many rules as the number of basic motions, avoid recognition processing by machine learning for an event having a low degree of freedom, and improve recognition accuracy of a motion having a high degree of freedom.

Second Embodiment

The embodiment of the present invention has so far been explained, but the present invention may be implemented by various forms other than the embodiment described above.

Correction

For example, an example in which recognition of a basic motion by using the process recognition processing is performed in the case of a jump type event in gymnastics has been explained in the first embodiment, but it is not limited thereto. For example, even for a jump type event, in the case of a specific element for which recognition criteria are specified in scoring rules, such as "ring jump", by correcting a recognition result with a result feature amount, credibility of the recognition accuracy can be improved.

Figure 19:
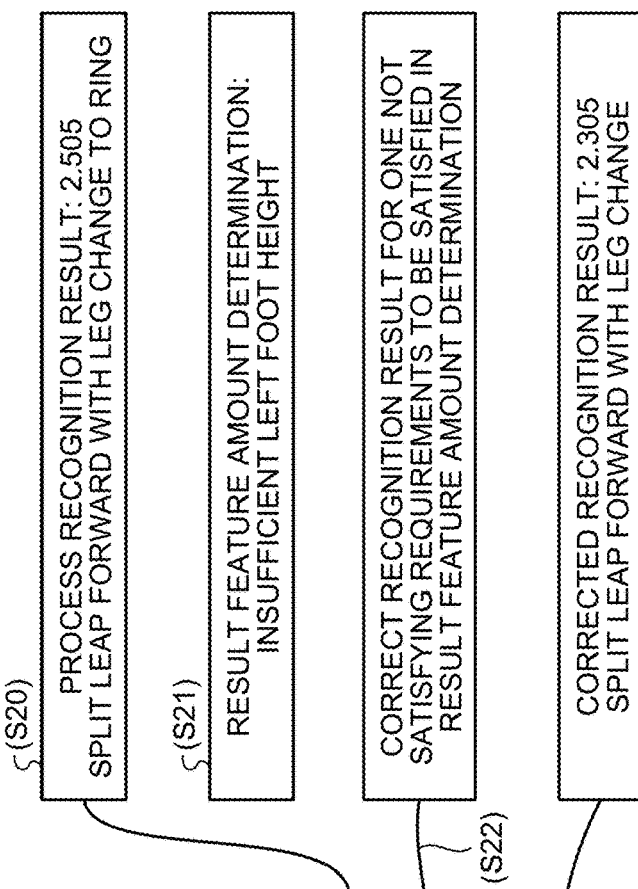
FIG. 19 is a diagram explaining correction based on a result feature amount for a process recognition result.

FIG. 19 is a diagram explaining correction of a process recognition result based on a result feature amount. A numerical value in FIG. 19 are element numbers by scoring rules of elements corresponding to basic motions. Similar basic motions correspond to rows, and requirements to be satisfied correspond to columns. Herein, an example in which a process recognition result is corrected by a determination result based on a result feature amount, and a final basic motion recognition result is acquired will be explained.

For example, suppose that a process recognition result is "2.505", and "split leap forward with leg change to ring" has been recognized as a basic motion (S20). At this time, the recognizing device 50 calculates a result feature amount by using skeleton information within the same segmented section because the recognized basic motion corresponds to a predetermined "ring jump" family. The recognizing device 50 detects that "height of a left foot" that is a recognition factor for "split leap forward with leg change to ring" is insufficient based on a "difference in height between a left foot and a shoulder" included in the result feature amount (S21).

The recognizing device 50 corrects a recognition result for one not satisfying requirements to be satisfied at determination of a result feature amount (S22). That is, the recognizing device 50 refers to the result feature-amount rule 56, and determines that a basic motion satisfying the calculated result feature amount is "split leap forward with leg change (2.305)" (S23). Thus, the recognizing device 50 can improve the credibility of recognition accuracy by performing correction of a recognition result by correcting a process recognition result by a result feature amount.

Application Example

In the embodiments described above, it has been explained with artistic gymnastics as an example, but it is not limited thereto, and is also applicable to other sports in which athletes perform a series of element, and judges make scoring. Examples of other sports include figure skating, rhythmic gymnastics, cheerleading, diving, kata in karate, aerials in mogul skiing, and the like. Moreover, in the embodiments described above, it is also applicable to estimation of a position of either joint out of the 18 joints, or a position of a portion between joints. Furthermore, not limited to gymnastics, for figure skating, rhythmic gymnastics, cheerleading, and the like including both elements of a jump type and a flip type (rotation type), similarly to the first embodiment, recognition methods can be switched depending on whether a flip action is included. Moreover, in the case of rehabilitation, recognition methods can be switched depending on whether an up and down motion of stairs or the like is included, or whether a bending and stretching motion during walk is included.

Skeleton Information

Furthermore, in the embodiments described above, an example in which training and recognition using positions of the respective 18 joints are performed has been explained, but it is not limited thereto, and training and the like can be performed, specifying one or more joints. Moreover, in the embodiments described above, positions of respective joints are explained as an example of the skeleton information, but it is not limited thereto, and angles of respective joints, orientations of arms and legs, an orientation of a face, and the like can be adopted.

Numerical Values and the Like

Numerical values used in the embodiments described above are only one example and not intended to limit the embodiments, but the configuration can be arbitrarily changed. Moreover, the number of frames, the number of correct answer information (label) of basic motions, and the like are also one example, and the configuration can be arbitrarily changed. Furthermore, the model is not limited to a neural network, but various machine learning and deep learning can be used.

System

The processing procedure, the control procedure, the specific names, and information including various kinds of data and parameters indicated in the documents and the drawings can be arbitrarily changed unless otherwise specified.

Moreover, the illustrated respective components of the respective devices are of functional concept, and it is not always configured physically as illustrated. That is, specific forms of distribution and integration of the respective devices are not limited to the ones illustrated. That is, all or some thereof can be configured to be distributed or integrated functionally or physically in arbitrary units according to various kinds of loads, usage conditions, and the like. Furthermore, the respective 3D laser sensors may be integrated in the respective devices, or may be arranged as external devices of the respective devices to be connected by communication and the like.

For example, recognition of a basic motion and recognition of an element may be implemented by separate devices. Moreover, the training device 10, the recognizing device 50, and the scoring device 90 can be implemented by arbitrarily combined devices. The acquiring unit 61 is one example of an acquiring unit, the estimating unit 63 is one example of a first determining unit and a second determining unit, and the element recognizing unit 67 is one example of an output unit.

Furthermore, as for the respective processing functions performed by the respective devices, all or an arbitrary part thereof can be implemented by a CPU and a computer program that is analyzed and executed by the CPU, or can be implemented as hardware by wired logic.

Hardware

Next, a hardware configuration of a computer, such as the training device 10, the recognizing device 50, and the scoring device 90, will be explained. Because the respective devices have similar configurations, they are explained as a computer 100 herein, and the recognizing device 50 will be explained as a specific example.

Figure 20:
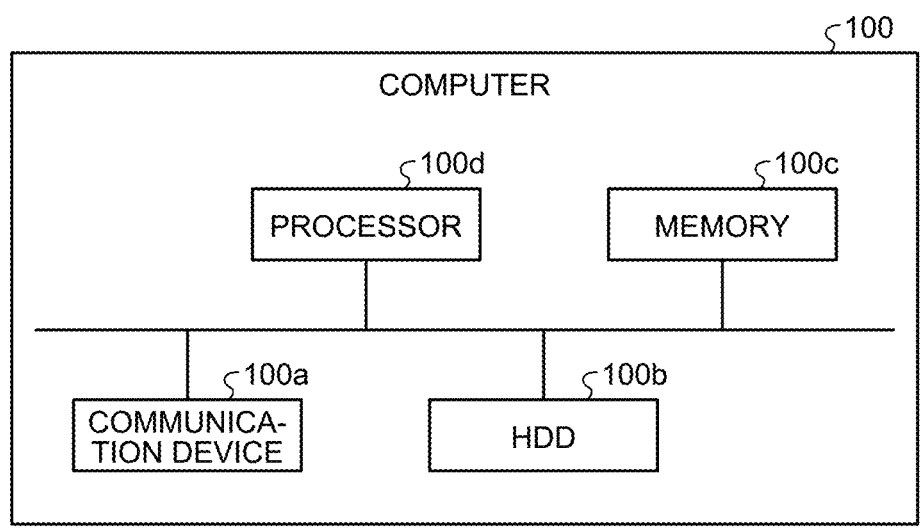
FIG. 20 is a diagram explaining a hardware configuration example.

FIG. 20 is a diagram explaining a hardware configuration example. As illustrated in FIG. 20, the computer 100 includes communication device 100a, a hard disk drive (HDD) 100b, a memory 100c, and a processor 100d. Moreover, respective components illustrated in FIG. 20 are connected to one another through a bus or the like.

The communication device 100a is a network interface card or the like, and communicates with other servers. The HDD 100b stores a program and a database (DB) to cause functions illustrated in FIG. 10 and the like.

The processor 100d reads a program to perform processing similar to the respective processing units illustrated in FIG. 10 from the HDD 100b and loads it on the memory 100c, and thereby causes processes to perform the respective functions explained in FIG. 10 and the like. That is, this process performs functions similar to the respective processing units included in the recognizing device 50. Specifically, for example, in the recognizing device 50, the processor 100d reads out programs that have functions similar to the acquiring unit 61, the data generating unit 62, the estimating unit 63, the element recognizing unit 67, and the like from the HDD 100b. The processor 100d execute processes to perform processing similar to those of the acquiring unit 61, the data generating unit 62, the estimating unit 63, the element recognizing unit 67, and the like.

As described, the computer 100 acts as an information processing apparatus that performs a recognition method by reading and executing a program. Moreover, the computer 100 can also be configured to read out the programs described above from a recording medium by a medium reader device, and to execute the read programs described above, thereby implementing functions similar to those of the embodiments described above. The program described in the other embodiment is not limited to be executed by the computer 100. For example, the present invention can be applied similarly also in a case in which the program is executed by other computers or servers, or in a case in which the program is executed in cooperation of these.

In one aspect, recognition accuracy of a motion having a high degree of freedom can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A motion recognition method comprising:
    acquiring skeleton information by using a captured depth map, in chronological order, that includes positions of respective joints of a subject performing a series of motions that includes a plurality of basic motions, using a processor;
    segmenting the series of motions based on the acquired skeleton information, using the processor;
    first determining segmented basic motions are necessary to be observed its process or not necessary for each of a plurality of sections based on the acquired skeleton information, using the processor;
    second determining which one of a first motion recognition method using a first feature amount that is determined as a result of the basic motion determined at the first determining, and a second motion recognition method using a second feature amount that changes in a process of the basic motion is to be adopted, depending on a type of the basic motions, using the processor;
    third determining a type of the basic motion by using the skeleton information by either determined one of the first motion recognition method and the second motion recognition method, using the processor; and
    outputting the determined type of the basic motion, using the processor.

2. The motion recognition method according to claim 1, wherein
    the third determining includes determining a type of a basic motion in the respective sections according to a correspondence rule in which a unique one of the first feature amount and the type of the basic motion are associated with the type of the basic motion that is calculated by using the skeleton information in the section belonging to the basic motion.

3. The motion recognition method according to claim 1, wherein
    the third determining includes determining a type of a basic motion in the respective sections based on a result acquired by inputting respective joint vectors corresponding to the respective sections to a training model that has been trained by using a joint vector indicating an orientation of each joint calculated as the second feature amount with skeleton information in a section belonging to the basic motion as an explanatory variable, and the type of the basic motion as an objective variable.

4. The motion recognition method according to claim 1, wherein
    the third determining includes calculating the first feature amount when it has been determined as a specific basic motion by the second motion recognition method, and correcting a recognition result from the second motion recognition method by the first motion recognition method using the first feature amount.

5. The motion recognition method according to claim 1, wherein
    the acquiring includes acquiring skeleton information including positions of respective joints of a performer chronologically for gymnastics performance including a plurality of elements,
    the segmenting includes segmenting the gymnastics performance into the plurality of sections according to whether a landing position on a ground or a supporting position on a gymnastics apparatus is included,
    the second determining includes determining which of the first motion recognition method and the second motion recognition method is to be adopted for each of the sections, depending on whether it is an event in which the gymnastics performance includes an element including a flip, and
    the third determining includes determining a type of a basic motion in each section by either determined one of the first motion recognition method and the second motion recognition method.

6. The motion recognition method according to claim 5, wherein
    the outputting includes distinguishing each element in the series of motions by combining the determined types of basic motions in the respective sections to output.

7. The motion recognition method according to claim 1, wherein the depth map is captured by a 3D laser sensor.

8. A non-transitory computer-readable recording medium having stored therein a motion recognition program that causes a computer to execute a process comprising:
    acquiring skeleton information by using a captured depth map, in chronological order, that includes positions of respective joints of a subject performing a series of motions that includes a plurality of basic motions;
    segmenting the series of motions based on the acquired skeleton information;
    first determining segmented basic motions are necessary to be observed its process or not necessary for each of a plurality of sections based on the acquired skeleton information;
    second determining which one of a first motion recognition method using a first feature amount that is determined as a result of the basic motion determined at the first determining, and a second motion recognition method using a second feature amount that changes in a process of the basic motion is to be adopted, depending on a type of the basic motions;
    third determining a type of the basic motion by using the skeleton information by either determined one of the first motion recognition method and the second motion recognition method; and
    outputting the determined type of the basic motion.

9. The non-transitory computer-readable recording medium according to claim 8, wherein
    the third determining includes determining a type of a basic motion in the respective sections according to a correspondence rule in which a unique one of the first feature amount and the type of the basic motion are associated with the type of the basic motion that is calculated by using the skeleton information in the section belonging to the basic motion.

10. The non-transitory computer-readable recording medium according to claim 8 wherein
the third determining includes determining a type of a basic motion in the respective sections based on a result acquired by inputting respective joint vectors corresponding to the respective sections to a training model that has been trained by using a joint vector indicating an orientation of each joint calculated as the second feature amount with skeleton information in a section belonging to the basic motion as an explanatory variable, and the type of the basic motion as an objective variable.

11. The non-transitory computer-readable recording medium according to claim 8, wherein
the third determining includes calculating the first feature amount when it has been determined as a specific basic motion by the second motion recognition method, and correcting a recognition result from the second motion recognition method by the first motion recognition method using the first feature amount.

12. The non-transitory computer-readable recording medium according to claim 8 wherein
the acquiring includes acquiring skeleton information including positions of respective joints of a performer chronologically for gymnastics performance including a plurality of elements,
the segmenting includes segmenting the gymnastics performance into the plurality of sections according to whether a landing position on a ground or a supporting position on a gymnastics apparatus is included,
the second determining includes determining which of the first motion recognition method and the second motion recognition method is to be adopted for each of the sections, depending on whether it is an event in which the gymnastics performance includes an element including a flip, and
the third determining includes determining a type of a basic motion in each section by either determined one of the first motion recognition method and the second motion recognition method.

13. The non-transitory computer-readable recording medium according to claim 12, wherein
the outputting includes distinguishing each element in the series of motions by combining the determined types of basic motions in the respective sections to output.

14. An information processing apparatus comprising:
a memory; and
a processor coupled to the memory and the processor:
acquire skeleton information by using a captured depth map, in chronological order, that includes positions of respective joints of a subject performing a series of motions that includes a plurality of basic motions;
segment the series of motions based on the acquired skeleton information;
first determine segmented basic motions are necessary to be observed its process or not necessary for each of a plurality of sections based on the acquired skeleton information;
second determine which one of a first motion recognition method using a first feature amount that is determined as a result of the basic motion determined at the first determining, and a second motion recognition method using a second feature amount that changes in a process of the basic motion is to be adopted, depending on a type of the basic motions;
third determine a type of the basic motion by using the skeleton information by either determined one of the first motion recognition method and the second motion recognition method; and
output the determined type of the basic motion.

* * * * *